United States Patent

Myers et al.

Patent Number: 6,019,559
Date of Patent: Feb. 1, 2000

[54] FASTENER HAVING SPIRAL SHAPED COLLAR PORTION

[75] Inventors: Alan R. Myers, Quail Valley; Albert K. Yamamoto, Huntington Beach, both of Calif.

[73] Assignee: Fairchild Holding Corp., Chantilly, Va.

[21] Appl. No.: 08/863,222

[22] Filed: May 27, 1997

Related U.S. Application Data

[62] Division of application No. 08/689,618, Aug. 12, 1996, Pat. No. 5,669,746.

[51] Int. Cl.⁷ .............................. F16B 19/00; F16B 35/00; B25B 7/12
[52] U.S. Cl. ...................... 411/361; 411/366.1; 411/414; 411/937.2; 81/302
[58] Field of Search ............................... 411/41, 60, 361, 411/366, 414, 937.2, 366.1, 366.3; 81/302

[56] References Cited

U.S. PATENT DOCUMENTS

| | | | |
|---|---|---|---|
| 4,537,542 | 8/1985 | Pratt et al. | 411/60 X |
| 4,548,533 | 10/1985 | Pratt | 411/60 X |

*Primary Examiner*—Neill Wilson
*Attorney, Agent, or Firm*—Irving Keschner

[57] ABSTRACT

An improved fastener comprising a head portion, a flange portion, a shank portion which extends through two aligned apertures formed in adjacent panels and a collar swaged on the shank portion. The shank portion includes a gripping portion having a plurality of gripping surfaces formed between a plurality of cone shaped grooves, the configuration of the gripping portion being spiral shaped. The collar is installed by first positioning it over the fastener shank portion, an installation tool then swaging the collar thereto, the collar being tightly held by the multiple gripping surfaces to prevent movement in the direction of the longitudinal axis of the fastener. A mating spiral shaped configuration is formed along the interior surface of the collar during the swaging process. In order to remove the collar, a tool having pivotable jaw members is positioned in the space formed between the bottom surface of the shank portion and the overhanging portion of the collar, the jaw members being forced apart which, in a turn, forces the collar to expand outwardly from the fastener shank portion. A tool then engages the collar and rotates it in the counterclockwise direction, enabling the collar to spin off the shank portion.

4 Claims, 7 Drawing Sheets

FASTENER HAVING SPIRAL SHAPED COLLAR PORTION

This application is a division of application Ser. No. 08/689,618, filed Aug. 12, 1996, now U.S. Pat. No. 5,669,746.

BACKGROUND OF THE INVENTION

1. Field of the Invention

The present invention relates to improved fasteners that utilize swaged-on collars.

2. Description of the Prior Art

A type of prior art fastener widely utilized in the aerospace industry typically comprises head, shank and pin tail portions, the shank portion extending through aligned apertures formed in adjacent panels, the shank portion typically having a single gripping ledge formed thereon. A collar is swaged onto the shank portion in a manner such that the collar is secured by the gripping ledge in place against a surface of one of the panels.

Occasions arise wherein it is desired to remove the fastener described above from its installation. This in turn requires that the swaged-on collar be machined off using a special tool. The possibility exists that the single gripping ledge will be damaged during collar removal, thus preventing the fastener from being reused. In addition, the removal process is relatively time consuming, increasing the costs associated with the process. Finally, the conventional arrangement forces the collar tightly against the panel surface. Certain applications, on the other hand, dictate that the collar be positioned loosely against the panel surface.

What is therefore desired is to provide a fastener system of the type described hereinabove wherein the swaged-on collar can be removed without damaging the shank portion and wherein removal could be accomplished relatively quickly.

SUMMARY OF THE INVENTION

The present invention provides an improved fastener comprising a head portion, a flange portion, a shank portion which extends through aligned apertures formed in adjacent panels, and a collar swaged on the shank portion of the fastener, the shank portion comprising a plurality of gripping surfaces having angled surfaces formed between a plurality of spiral grooves. The collar is first positioned over the end of the shank portion and an installation tool then swages the collar thereon. The collar is tightly held by the multiple gripping surfaces, thereby preventing movement in the direction of the longitudinal axis of the fastener. When the collar is swaged onto the fastener shank portion, mating spiral grooves are formed along the interior surface of the collar. In order to remove the collar from the fastener shank portion, a tool having pivotable jaw members is positioned in the space formed between the bottom surface of the shank portion and the overhanging portion of the swaged collar, the jaw members being forced apart which, in turn, forces the collar to expand outwardly from the shank portion. A tool then engages the collar, the collar being easily removed when the tool rotates, or spins, it in the counterclockwise direction.

The present invention thus provides a fastener that enables a swaged collar to be quickly and easily removed while not damaging the gripping surfaces formed on the fastener shank portion, thus increasing the fastener reusability and decreasing the disassembly downtime, this in turn providing significant cost savings.

DESCRIPTION OF THE DRAWINGS

For a better understanding of the invention as well as other objects and further features thereof, reference is made to the following description which is to be read in conjunction with the accompanying drawings wherein.

DESCRIPTION OF THE INVENTION

Figure 1:
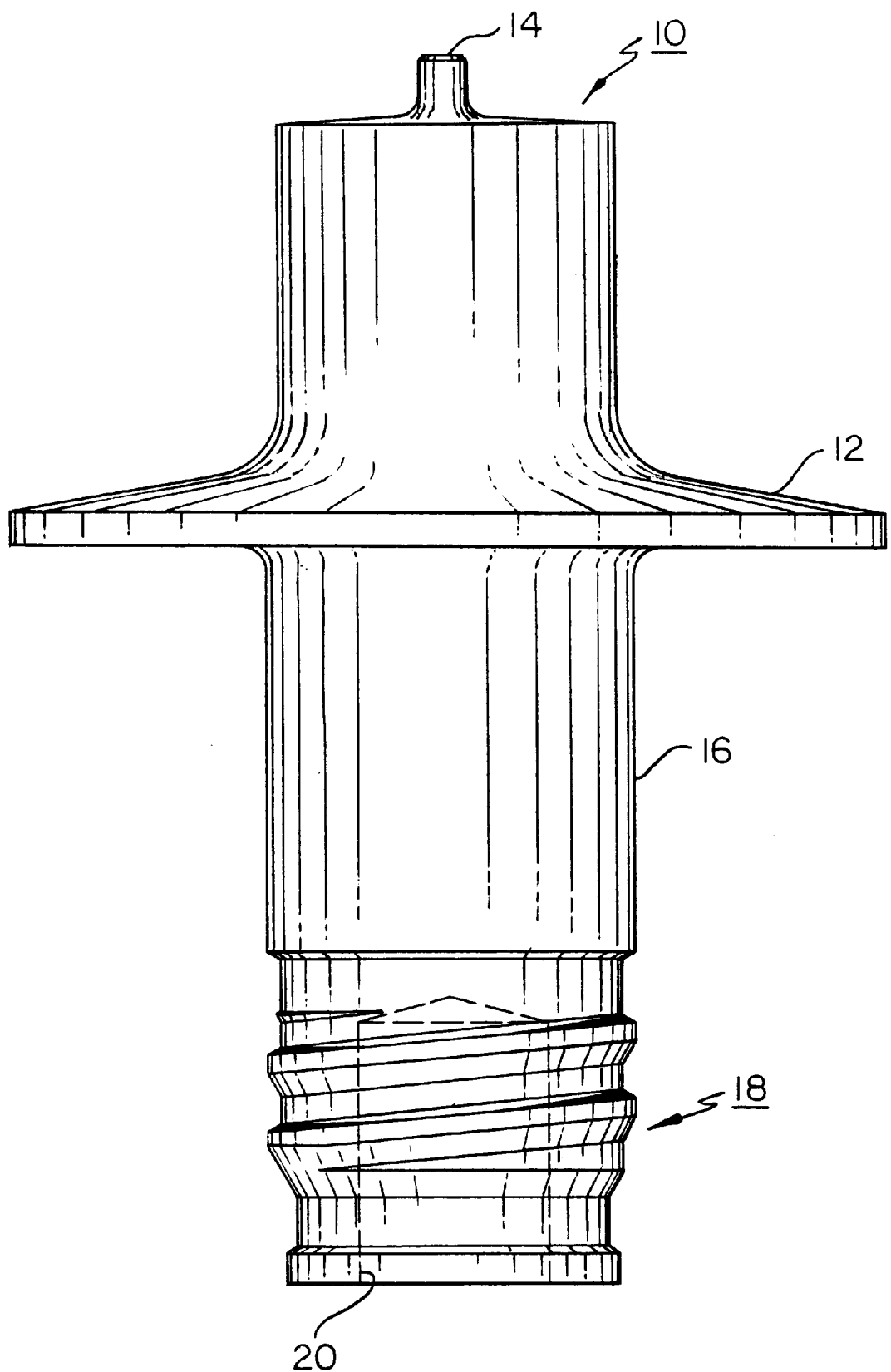
FIG. 1 is a plan view of the fastener of the present invention.
Figure 2:
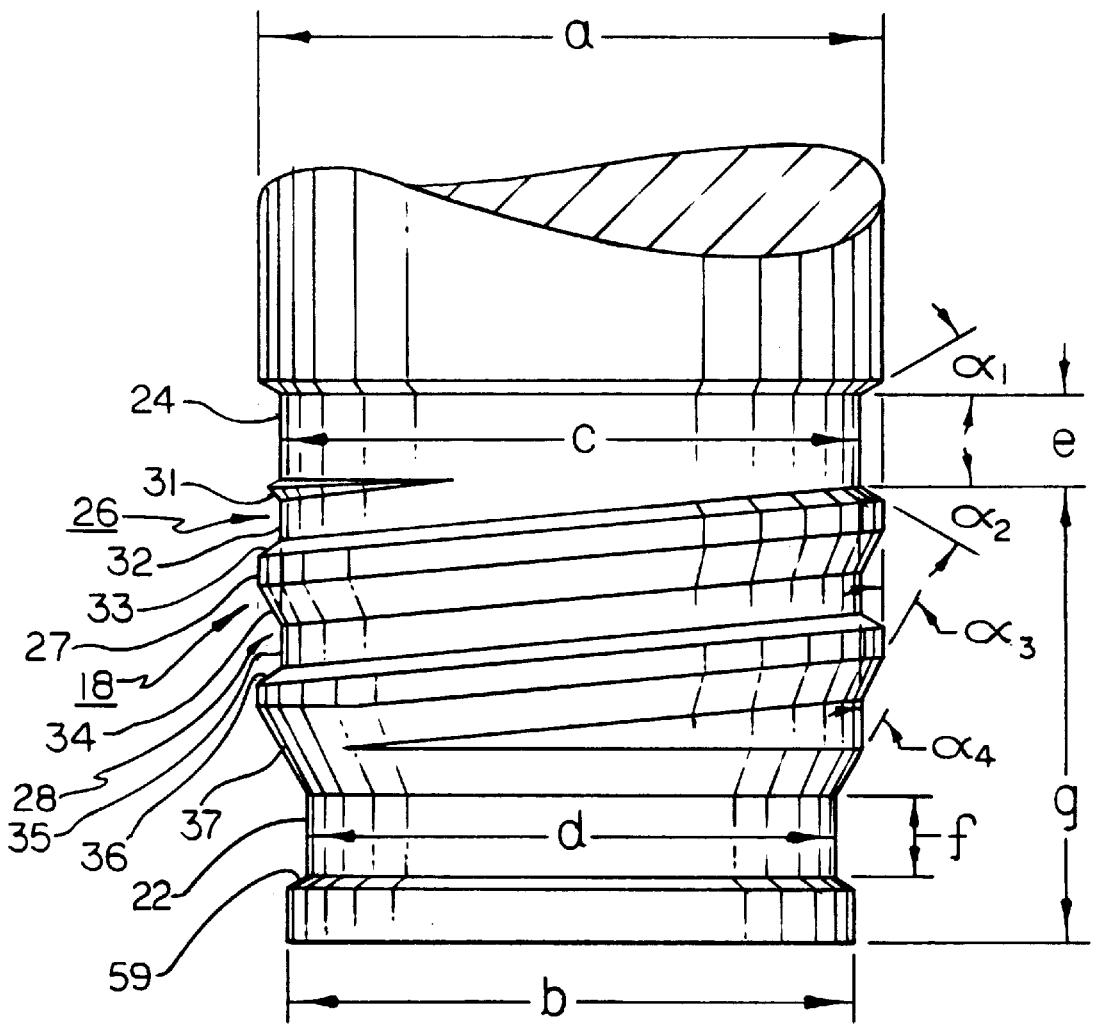
FIG. 2 is a detail of the grooved portion of the fastener shown in FIG. 1.

Referring to FIG. 1, fastener 10 of the present invention comprises head portion 12 having a weld tip 14 formed thereon, a threadless shank portion 16 of a first diameter, and a collar gripping portion 18 comprising two complete spiral locking forms, extending from the shank portion 16. A hole 20 is formed in portion 18 to reduce the overall weight of the fastener 10. The present invention is primarily directed to the construction of gripping portion 18, a detail of which is shown in FIG. 2. It should be noted that only two complete spiral locking forms (similar to thread configurations) are required to provide the necessary locking grooves, reducing the length of gripping portion 18 which in turn reduces the weight of the fastener, which is critical in many applications.

As shown in FIG. 2, gripping portion 18 comprises annular main grooves 22 and 24 and a spiral surface configuration comprising secondary grooves 26 and 28, separated by shoulder 27. Secondary groove 26 comprises an inwardly extending cone shaped surface 31, groove 32 and outwardly extending cone shaped surface 33; secondary groove 28 comprises inwardly extending cone shaped surface 34, groove 35 and outwardly extending cone shaped surface 36. The spiral surface configuration of gripping portion 18 enables, as will be set forth in more detail hereafter, a swaged collar to be spun off during the removal process.

Figure 3:
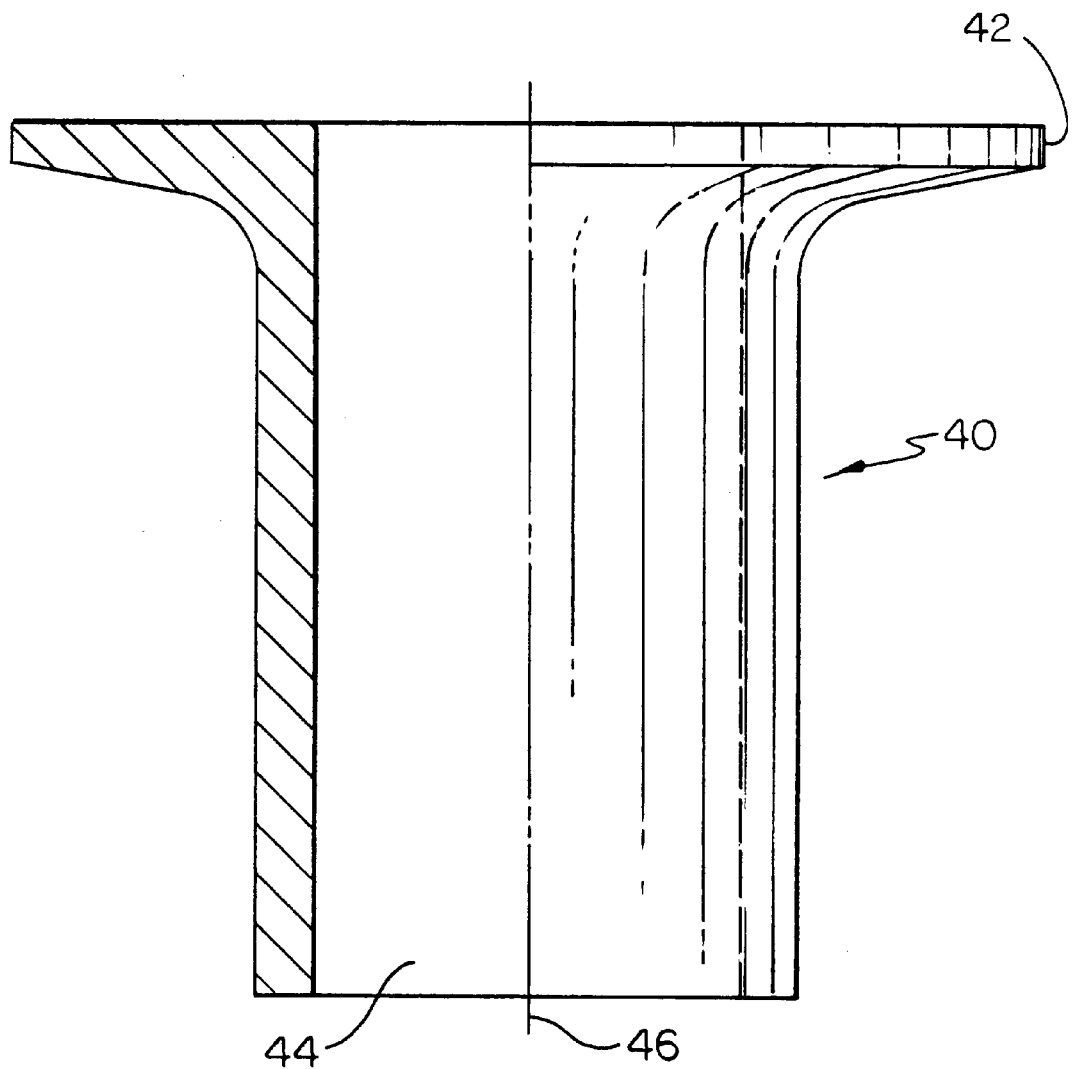
FIG. 3 is a partial sectional view of the fastener collar utilized in the present invention.

Typical dimensions (in inches) for gripping portion 18 that have been successfully utilized are as follows:

$a = .154$   $e = 0.030$
$b = 0.140$   $\alpha_3 = 30°$
$\alpha_1 = 30°$   $f = 0.020$
$c = 0.144$   $g = 0.110$
$d = 0.130$   $\alpha_4 = 30°$
$\alpha_2 = 30°$ FIG. 3 illustrates swaging collar 40, collar 40 comprising a cylindrically shaped member having a flange portion 42 and an aperture 44 extending along the longitudinal axis 46 of collar 40.

Figure 4:
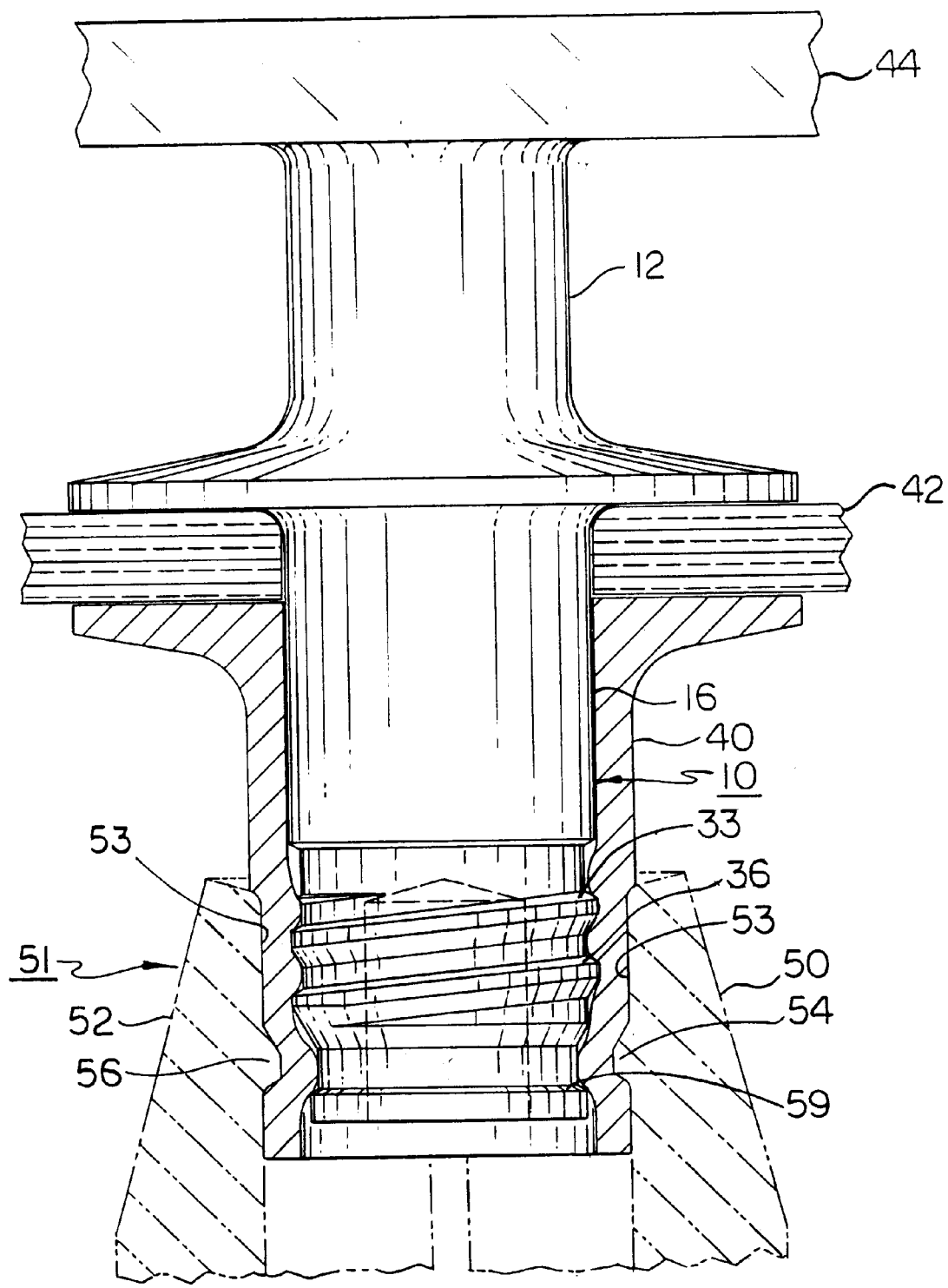
FIG. 4 is a partial sectional view illustrating the installation of the fastener of the present invention.

FIG. 4 illustrates installation of swaging collar 40 onto shank portion 16, thus securing insulation blanket 42 to structure 44. It should be noted that weld tip 14 (FIG. 1) is melted during the weld process which secures head portion 12 to structure 44. The swaging process is conventional but will now be briefly described. After head portion 12 is secured to structure 44, shank portion 16 is positioned to extend through an aperture formed in blanket 42, collar 40 thereafter being positioned over shank portion 16 as illustrated. The jaw portions 50 and 52 of an installation tool 51 are positioned over the outer diameter of collar 40 and then forced together, causing the metal from the internal surface 53 of collar 40 to start to flow into the grooves formed in gripping portion 18. To aid in the material flow, protrusions 54 and 56 are formed on the interior surfaces of jaw portions 50 and 52 respectively. Mating thread-like spiral grooves are formed on the interior surface of collar 40 during the swaging process. Cone shaped surfaces 33, 36 and 59 grip collar 40 and prevent axial movement of the collar after the swaging process is completed.

Figure 5:
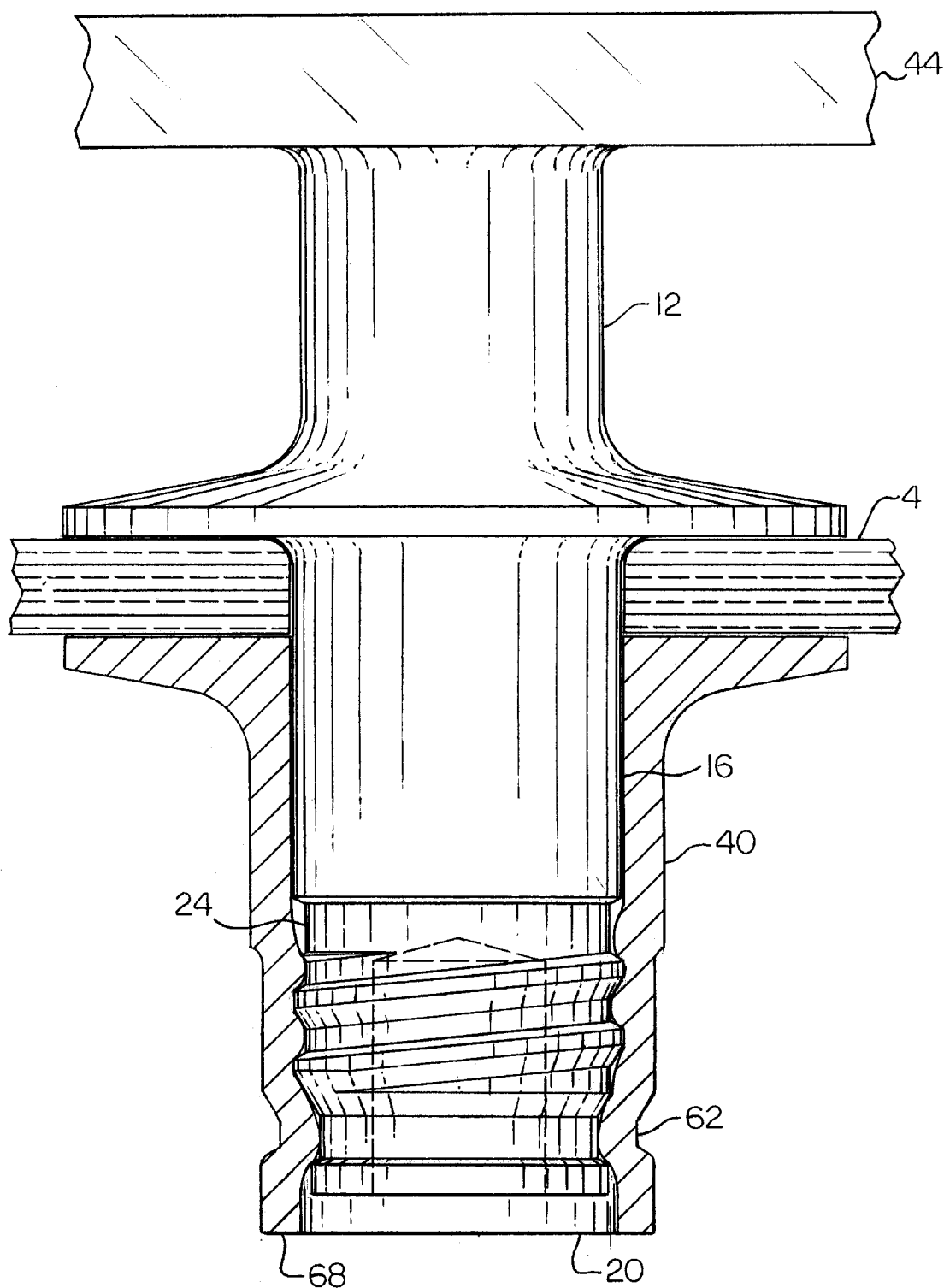
FIG. 5 illustrates the installed fastener of the present invention.

FIG. 5 is a partial sectional view illustrating the fastener 10 of the present invention after the installation process has been completed. Material from the inner surface of collar 40 flows into the grooves of gripping portion 18 and along the surfaces thereof as illustrated. An annular groove 62 is formed on collar 40 due to the annular protrusion 54 on tool 51.

Figure 6:
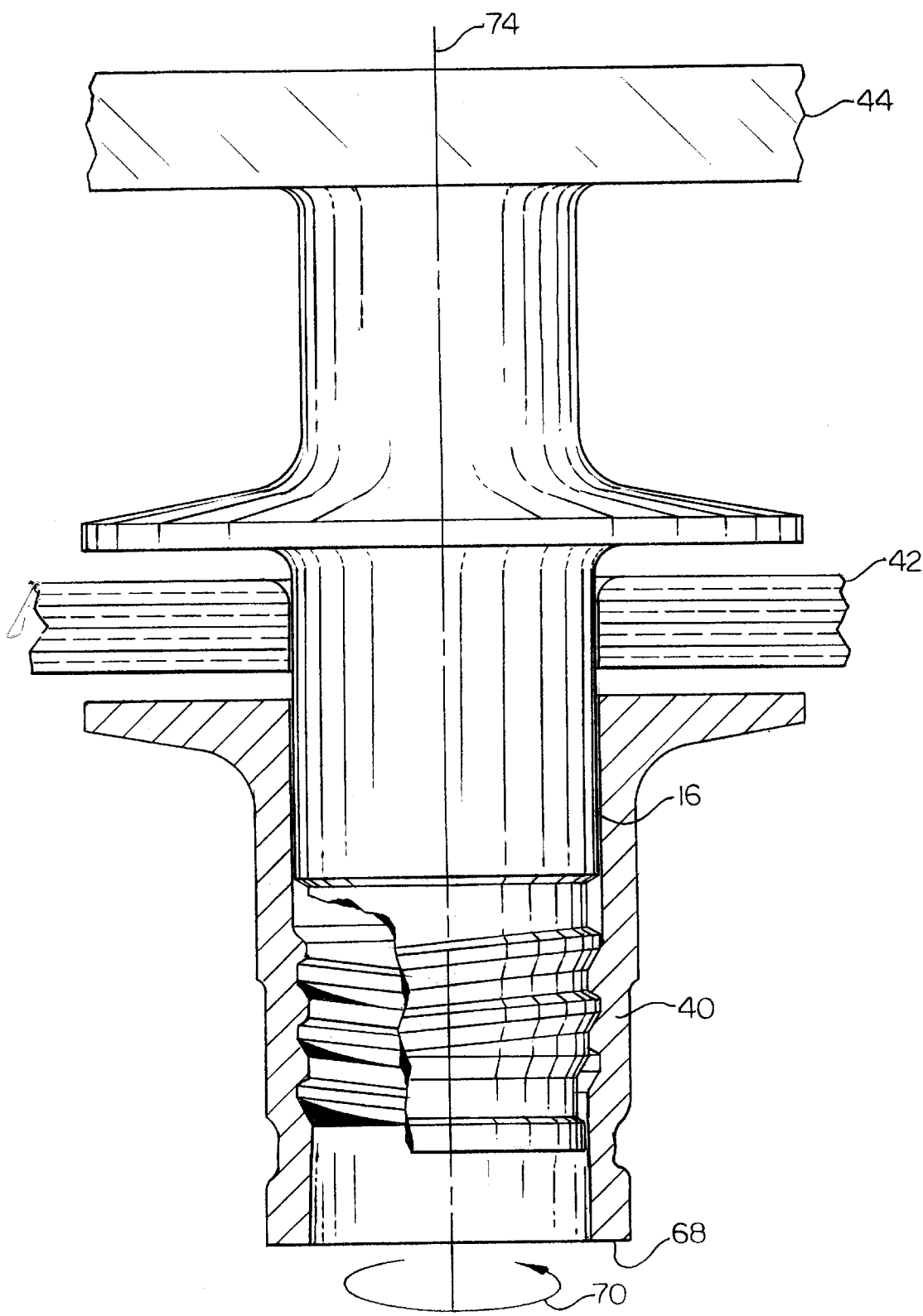
FIG. 6 is a partial sectional view illustrating the swaged collar at a position as it is being removed from the fastener shank portion.

FIG. 6 illustrates the removal of collar 40 from shank portion 16. Collar 40, when removed, enables the fastener and blanket 42 to be separated for replacement of the fastener or blanket 42.

Figure 7:
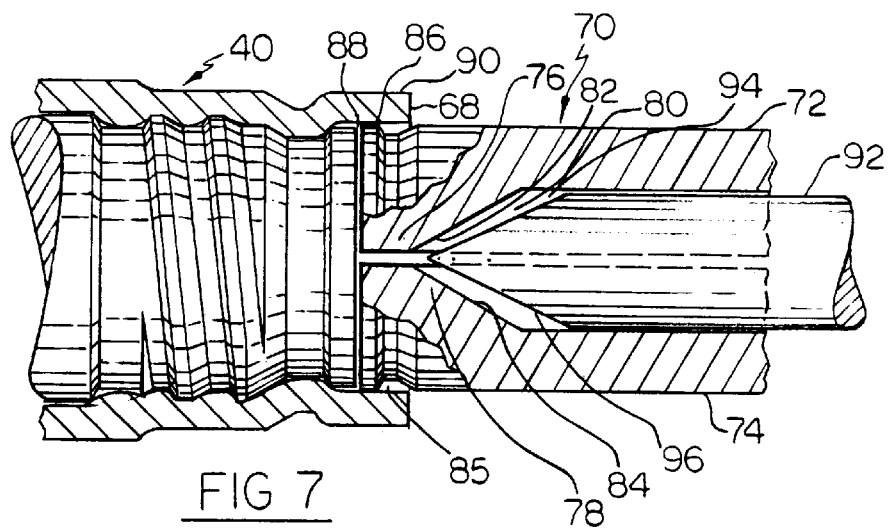
FIGS. 7–9 illustrates tools for removing the swaged collar.

Referring now to FIG. 7, removal tool 70 comprises cylindrical jaw members 72 and 74 having tip portions 76 and 78, respectively, and separated by channel 80 as illustrated. Tip portion 76 has an inclined ramp surface 82 and tip portion 78 has an inclined ramp surface 84. The front portion 86 of tool 70 is inserted into the space 85 formed between the bottom surface 88 of shank portion 16 and the portion 90 of collar 40 overhanging the bottom surface 88 of shank portion 16. A plunger member 92 having inclined front face surface portions 94 and 96 is then forced downwards, surface portion 94 engaging ramp surface 82, surface portion 96 engaging ramp surface 84, the wedge like action causing jaw members 72 and 74 to move apart.

Figure 8:
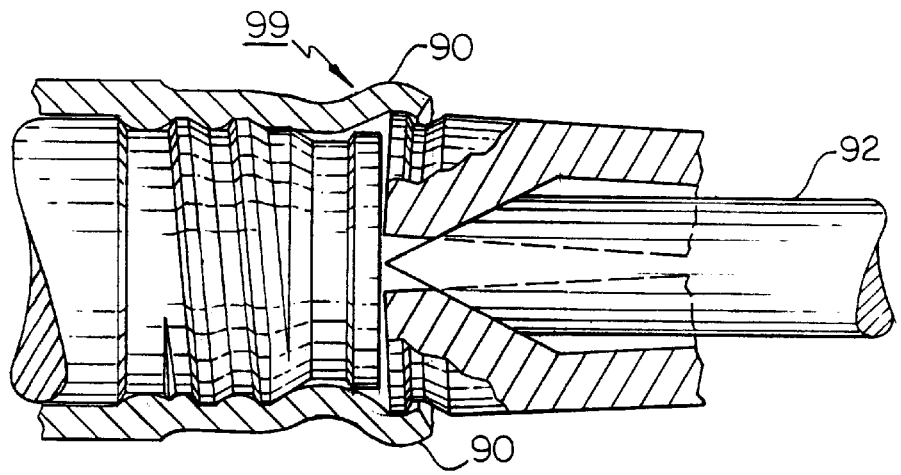
Figure 9:
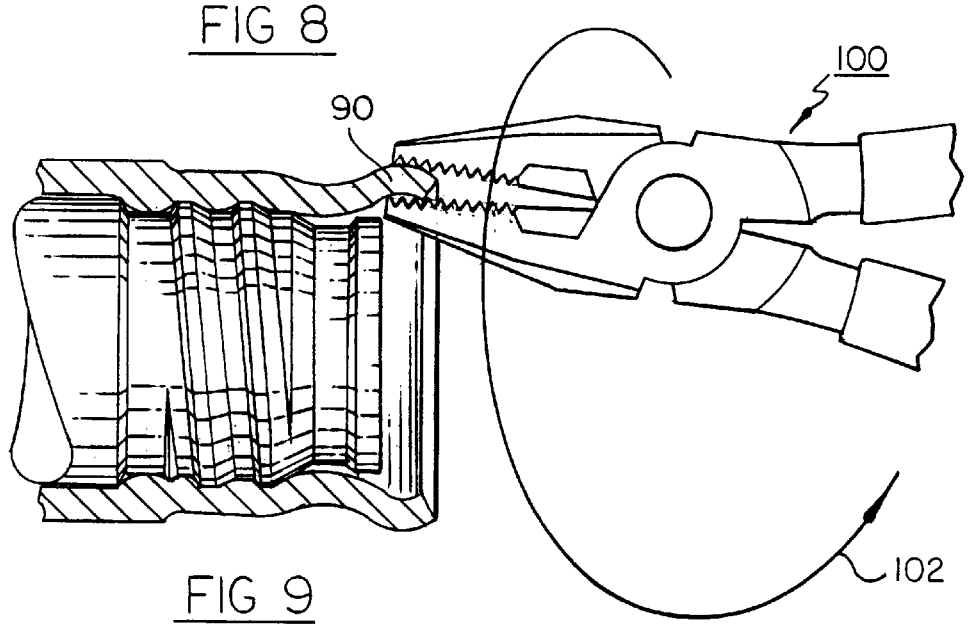

As the jaw members move apart, the inside diameter of collar portion 98 is expanded outwardly away from the surface of the far end area 99 of shank portion 16 as shown in FIG. 8. At this point, tool 70 is removed and a standard pliers type tool 100 is used to grip portion 90, tool 100 then being rotated counter clockwise in the direction of arrow 102 to fully remove collar 40 from shank portion 16.

An alternate removal technique is to strike collar 40 with a hammer, for example, at end 68, the conical surfaces 34 and 37 of the gripping portion 18 aiding in the collar removal by slightly loosening the fit of collar 40 on shank portion 16 by expanding the collar. The collar 40 is then rotated by removal tool 100 in the direction of arrow 102, rotation continuing until collar 40 is free from shank portion 16.

The particular configuration of gripping portion 18 provides two distinct advantages. The first is that the swaging operation provides a tight fit between collar 40 and shank portion 16 inhibiting movement of collar 40 in the direction of the longitudinal axis 74 of fastener 10. Since collar installation does not require a push/pull tool for grasping a pin tail as is typically used in the prior art, less force is generated between the collar and the contacting panel surface, a requirement in certain installations. Secondly, collar 40 can be easily removed when rotated, thus ensuring that the gripping edges on gripping portion 18 are not damaged, allowing fastener 10 to be reused when desired.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A system for removing a collar swaged onto a bolt having head and shank portions, said shank portions having an unthreaded first portion and a gripping second portion, said gripping portion having a first main annular locking groove and a plurality of secondary locking grooves, each of said secondary locking grooves including an inclined angular surface and a cone shaped surface, the gripping second portion having a spiral shaped configuration, mating thread-like spiral grooves being formed on the interior surface of said collar during swaging comprising:

a first tool for forcing the interior surface of said collar outwardly and away from the surface of said gripping second portion, said first tool comprising first and second law members, each having a tip portion, said first and second jaw members being spaced apart, and a member for insertion in the space between said in first and second jaw members whereby said jaw members are caused to move apart; and a second tool for gripping said collar and rotating it in a direction such that the collar is disengaged completely from said gripping second portion.

2. The system of claim 1 wherein said second tool comprises first and second jaw members, having first and second surfaces, the second surfaces of said first and second jaw members having serrations thereon enabling the gripping of said collar.

3. A method for removing a collar swaged onto a bolt having head and shank portions, said shank portions having an unthreaded first portion and a gripping second portion, said gripping portion having a first main annular locking groove and a plurality of secondary locking grooves, each of said secondary locking grooves including an inclined angular surface and a cone shaped surface, the gripping second portion having a spiral shaped configuration, mating thread-like spiral grooves being formed on the interior surface of said collar during swaging comprising the steps of:

forcing the interior surface of said collar outwardly and away from the surface of said gripping second portion; and gripping said collar and rotating it in a direction such that the collar is disengaged completely from said gripping second portion.

4. A method for removing a collar swaged onto a bolt having head and shank portions, said shank portions having an unthreaded first portion and a gripping second portion, said gripping portion having a first main annular locking groove and a plurality of secondary locking grooves, each of said secondary locking grooves including an inclined angular surface and a cone shaped surface, the gripping second portion having a spiral shaped configuration, mating thread-like spiral grooves being formed on the interior surface of said collar during swaging comprising the steps of:

striking an end surface of said collar whereby the collar cone shaped surfaces loose the fit of said collar on said shank portion; and gripping said collar and rotating it in a direction such that the collar is disengaged completely from said gripping second portion.

* * * * *